April 23, 1940.   J. H. ONIONS ET AL   2,198,039
RECTILINEAR MOTION BEARING
Filed Aug. 24, 1937    2 Sheets-Sheet 1
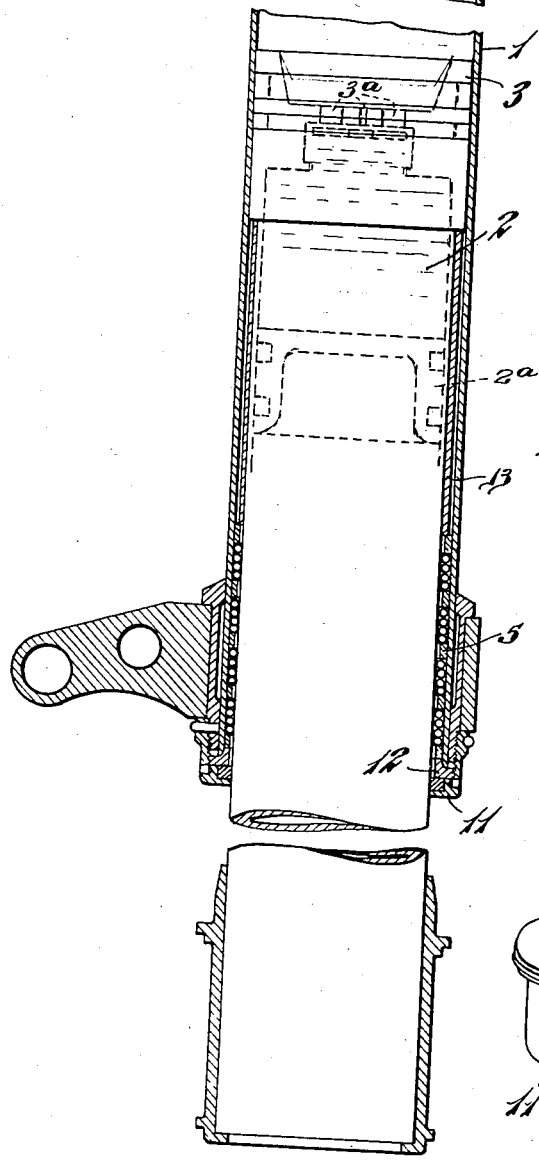

April 23, 1940. J. H. ONIONS ET AL 2,198,039
RECTILINEAR MOTION BEARING
Filed Aug. 24, 1937 2 Sheets-Sheet 2

INVENTORS
J. H. Onions.
P. W. Thornhill.
By Lacey & Lacey, Attys

Patented Apr. 23, 1940

2,198,039

UNITED STATES PATENT OFFICE 2,198,039

RECTILINEAR MOTION BEARING

John Henry Onions and Peter Warborn Thornhill, Leamington Spa, England; said Thornhill assignor to said Onions Application August 24, 1937, Serial No. 160,666
In Great Britain August 24, 1936

9 Claims. (Cl. 308—6)

This invention relates to rectilinear motion bearings, that is bearings employed between parts having a relative sliding motion, and is primarily intended for use between tubes telescoping one within the other, as in certain forms of shock absorber struts for aircraft, though it is obviously applicable to other uses.

The object of the invention is to provide a roller bearing which will readily conform to the cross-sectional outline of the members between which it is mounted, and yet is capable of supporting lateral thrust.

According to the invention, a rectilinear motion bearing comprises one or a plurality of coil springs disposed between the relatively moving surfaces, the centre line or centre lines of the spring or springs lying in a plane or planes perpendicular to the direction of relative movement of the surfaces.

According to one feature of the invention a rectilinear motion bearing comprises a plurality of coil springs disposed between the relatively moving surfaces with their centre lines in planes perpendicular to the direction of relative movement of the surfaces, and a cage or spacing member which locates the springs relatively to each other.

The invention further provides, in a plunger and cylinder mechanism an antifriction bearing between the relatively sliding cylindrical surfaces, said bearing comprising a plurality of coiled springs arranged circumferentially side by side.

Preferably, the turns of the springs are close coiled so that they tend to support one another and also provide a relatively large area of rolling contact.

According to another feature of the invention, a plunger and cylinder mechanism comprises an inner rod or tube telescoping within an outer tubular member, a slotted sleeve disposed between the inner rod or tube and the outer tubular member, and a plurality of coil springs located in the slots of the sleeve, the springs engaging the inner surface of the outer member and the outer surface of the inner member, and rolling between these surfaces during relative telescoping movement of the matter.

A shock absorber for an aircraft is also provided comprising a cylinder tube, a plunger slidable therein, resilient means acting on the plunger within the cylinder tube to absorb the shocks, damping means for controlling the oscillation of the plunger, a plurality of coil springs between the cylinder tube and plunger, which springs engage with the interior of the cylinder tube and the exterior of the plunger, and a cage or spacing member locating the springs with their centre lines in planes perpendicular to the axis of the strut, the springs rolling between the surfaces when the members of the strut move relatively to each other.

The invention will now be described with reference to the accompanying drawings in which Figure 1 is an elevation, partly in section, of an oleo-pneumatic shock strut for aircraft use, in which a bearing according to the invention is incorporated;

Figure 2 is a perspective view with various parts broken away of a fragment of the strut shown in Figure 1;

Figure 3:
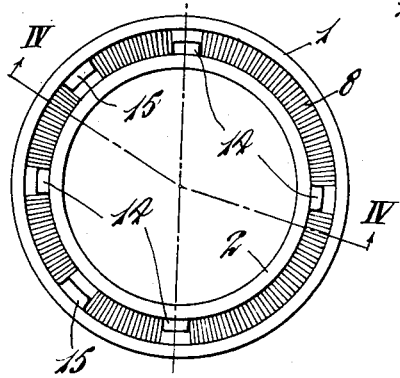
Figure 3 is a sectional plan showing an alternative form of the bearing in which the coil springs are circumferentially located by longitudinal ribs formed on the walls of the tubes, the right and left hand halves of the figure showing slightly different arrangements.

Referring to Figures 1 and 2 of the drawings, 1 is the cylinder tube of an oleo-pneumatic strut, and 2 the plunger tube.

The strut shown comprises a plunger tube slidable within a cylinder tube, compressed air being contained in the plunger tube 2, and liquid in the cylinder tube 1, the air and liquid being separated by a floating piston 2a within the plunger tube, and the movements of the strut being damped by the passage of the liquid through controlled orifices 3a in the head 3 of the plunger.

The external diameter of the plunger tube 2 is sufficiently smaller than the internal diameter of the cylinder tube 1 to leave a narrow annular space 4. In this space is fitted a sleeve 5 formed with four circumferential series of slots 6, each series comprising four slots each subtending slightly less than 90° at the centre of the sleeve, the slots being separated by narrow strips 7 of the material of the sleeve.

The slots of each series are displaced circumferentially through 45° with respect to the next adjacent series, so that the slots of the several series are staggered.

The slotted sleeve 5 forms a cage or spacing member for the coil springs 8, several of which, for example four, are arranged side by side in each slot. The springs are not secured in any way, but are simply placed in the slots, and held in place by the walls of the tubes 1 and 2 with which they engage. It will be understood that the slots may each receive only one spring if preferred, or any other number.

A cap 11 threaded on the end of the cylinder tube 1 secures in position a stop ring 12 against which the cage 5 abuts when the strut is fully extended, a sleeve 13 surrounding the plunger tube also abutting against the cage at the other end, so that the sleeve and cage form together a spacer to limit the extension of the strut.

The springs 8 are formed of square section wire, and are close coiled, so that each spring provides a substantially continuous line contact with both of the surfaces with which it engages, along its whole length. The springs may alternatively be of D section with the flat face of the wire on the exterior of the coil, or round section wire may be employed, though naturally with round wire a less effective contact with the tube surfaces is obtained.

Figure 4:
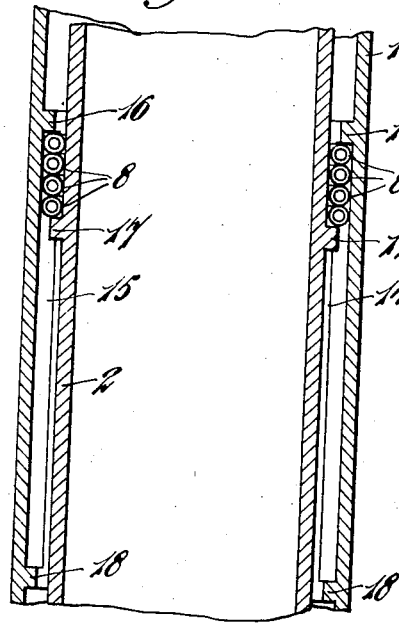
Figure 4 is a sectional elevation on the line IV—IV of Figure 3.

Figures 3 and 4 show a modified form of the invention, in which the springs are not associated with a cage.

The cylinder tube 1 and the plunger tube 2 are each formed with longitudinal ribs 14 and 15 which locate the springs circumferentially, and they have no location in the axial direction except in the extreme positions of the strut at either end of its stroke, when they are engaged by stops.

In Figure 3 the left hand half and the right hand half show slightly different arrangements. On the right hand side the ribs 14, for example four in number, are all formed on the exterior of the plunger tube, whilst on the left hand side these ribs are formed alternatively on the plunger tube and cylinder tube, there being four ribs 14 spaced around the circumference of the plunger tube and four ribs 15 spaced around the inner surface of the cylinder tube. In the arrangement shown in the left hand side of the figure the bearing will act to resist relative turning of the plunger tube and cylinder tube.

Figure 4 is a sectional elevation on the line IV—IV of Figure 3 showing a bearing consisting of four rows of springs. The view shows the position of the bearing in one extreme position of the strut, the springs lying between a stop 16 on the cylinder tube and a stop 17 on the plunger tube. As the strut moves away from its extreme position the springs 8 roll away from the stops 16, 17 and in the other extreme position of the strut they meet with a stop 18 on the cylinder tube, and a corresponding stop, not shown, on the plunger tube.

Any tendency of the springs to move, due to slipping, out of their proper positions in the cross-sectional planes of the strut is thus corrected whenever the strut reaches either end of its stroke.

Figure 5:
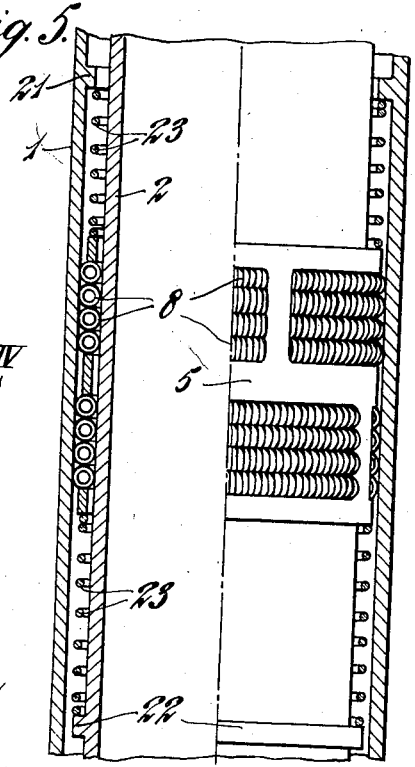
Figures 5 and 6 are further sectional elevations showing other modifications of the invention.

The form of bearing shown in Figure 5 has a cage 5 similar to that in Figures 1 and 2, except that only two circumferential series of slots are shown. Between each end of the cage and a suitable stop 21 or 22 is arranged a light spring 23, tending to prevent the possibility of the cage becoming stuck against one or other of its end stops due to slipping of the roller springs or from any other cause. A plurality of light springs acting between each end of the cage and the stops may be used instead of the single spring of large diameter.

Figure 6:
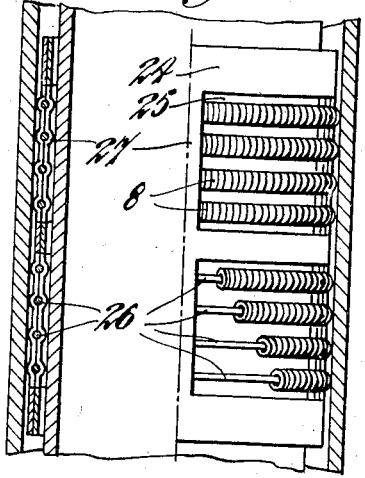

Figure 6 shows a bearing having a modified form of cage. In this arrangement the cage 24 has a metal frame formed with wide slots 25, and the rolling springs 8 are threaded on wires 26 secured to the longitudinal members 27 of the cage. The cage may be built up simply from the spring-carrying wires secured to longitudinal strips for spacing them apart.

The wires are of smaller diameter than the internal diameter of the springs, so that the latter are able to roll freely. Should the springs be distorted to oval form by excessive side loads on the strut, the wires 26 will give them some support.

Other modifications of the invention are possible. For example the bearing may be formed by a single continuous coil spring extending round the full circumference of the inner tube of a strut or like member, the ends of the spring abutting on one another or being screwed one into the other. A single spring may be wound several times round the tube in spiral form, and will still give the same effect.

The action of a bearing according to the invention will be readily understood. The resilience of the springs enables them to roll over the surfaces with which they are associated, rather in the manner of a plurality of individual rings each in a radial plane with respect to the strut axis. It thus replaces the usual sliding action by a rolling action, considerably reducing the friction set up, and reducing also the risk of the strut binding due to side thrust when the load imposed on it is not on the axial line of the strut.

In the above description the bearing has been described solely in relation to a shock strut for aircraft. It has, however, other applications, of which a few are referred to below.

There are some forms of motor vehicle suspension in which the front wheel stub axle is carried by a sleeve slidable on a substantially vertical shaft under the control of springs. The bearing according to the invention could be applied between the sleeve and shaft.

Another application is to control rods which transmit an operating pull or thrust from a controlling unit such as a hand lever to an operated device. Such rods are frequently supported by sleeves carried on hangers or pedestals, and the bearing according to the invention is well adapted for use in this position.

The bearing may also be used between relatively sliding surfaces other than those of rods, tubes and like members. Certain types of metal aircraft are constructed from corrugated sheet metal. The bearing according to the invention may be applied to sliding hatches and like members on surfaces of this kind. A hatch formed of corrugated material similar to that of which the aircraft skin is formed may be slidable in the direction of the corrugations, springs forming a bearing according to the invention being disposed between the hatch and the main covering to provide an easy sliding movement.

It is of course obvious that the bearing according to invention is primarily intended for use between surfaces which are curved in a direction transverse to their direction of relative motion.

What we claim is:

1. A plunger and cylinder mechanism comprising an inner member telescoping within an outer tubular member, a slotted sleeve disposed between the inner member and the outer tubular member, and a plurality of coil springs located in the slots of the sleeve, the springs engaging the inner surface of the outer member, and the outer surface of the inner member, and rolling between these surfaces during relative telescoping movement of the latter.

2. A plunger and cylinder mechanism according to claim 1, wherein the inner and outer members are of circular cross-section.

3. A shock absorber for aircraft comprising a cylinder tube, a plunger slidable therein, resilient means acting on the plunger within the cylinder tube to absorb the shocks, damping means for controlling the oscillation of the plunger, a plurality of springs between the cylinder tube and plunger, which springs engage with the interior of the cylinder tube and the exterior of the plunger, and a cage locating the springs with their centre lines in planes perpendicular to the axis of the strut, the springs rolling between the surfaces when the members of the strut move relatively to each other.

4. A rectilinear motion roller bearing for use between relatively sliding surfaces which are curved in a direction transverse to their direction of relative motion, comprising a plurality of coil springs disposed parallel to each other transversely of the direction of motion of the relatively moving surfaces, and a cage locating the springs relatively to each other, the cage being free to travel with the springs.

5. In a plunger and cylinder mechanism having relatively sliding cylindrical surfaces, an anti-friction bearing between the relatively sliding cylindrical surfaces, said bearing comprising a plurality of coiled springs arranged in a circumferential series of groups, and a cage locating said springs relatively to each other, the cage being free to travel with the springs.

6. A rectilinear motion roller bearing as claimed in claim 4, wherein the springs are close coiled.

7. In a plunger and cylinder mechanism having relatively sliding cylindrical surfaces, an anti-friction bearing between the relatively sliding cylindrical surfaces, said bearing comprising a plurality of coiled springs arranged in a circumferential series of groups, a cage comprising a sleeve formed with a plurality of slots, said groups of springs being arranged in each of the slots.

8. In a plunger and cylinder mechanism having relatively sliding cylindrical surfaces, an anti-friction bearing between the relatively sliding cylindrical surfaces, said bearing comprising a plurality of coiled springs arranged in groups, and a cage consisting of a sleeve formed with slots arranged in a plurality of circumferential series, each series being staggered relatively to the adjacent series, and a group of springs in each of said slots.

9. In a plunger and cylinder mechanism, an anti-friction bearing between relatively sliding surfaces of said mechanism, said bearing comprising a plurality of coiled springs disposed parallel to each other transversely of the direction of motion of the relatively sliding surfaces, a cage consisting of a sleeve formed with a plurality of slots, and wires secured to said sleeve and extending across the slots, the coiled springs being mounted on the wires.

JOHN HENRY ONIONS.
PETER WARBORN THORNHILL.